(12) United States Patent  (10) Patent No.: US 8,719,423 B2
Wyld  (45) Date of Patent: May 6, 2014

(54) DYNAMIC NETWORK TRANSPORT SELECTION

(75) Inventor: Jeremy Wyld, San Jose, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 12/944,601

(22) Filed: Nov. 11, 2010

(65) Prior Publication Data

US 2011/0055350 A1   Mar. 3, 2011

Related U.S. Application Data

(62) Division of application No. 11/620,700, filed on Jan. 7, 2007, now Pat. No. 7,840,685.

(51) Int. Cl.
*G06F 15/16*   (2006.01)

(52) U.S. Cl.
USPC ......................................................... 709/227

(58) Field of Classification Search
USPC ......................................................... 709/227
See application file for complete search history.

(56) References Cited

U.S. PATENT DOCUMENTS

| | | | |
|---|---|---|---|
| 5,854,985 A | 12/1998 | Sainton et al. | |
| 6,134,453 A | 10/2000 | Sainton et al. | |
| RE38,645 E | 11/2004 | O'Sullivan | |
| 6,917,964 B2* | 7/2005 | Kita et al. | 709/204 |
| 6,934,558 B1 | 8/2005 | Sainton et al. | |
| 6,961,584 B2* | 11/2005 | Leedom, Jr. | 455/552.1 |
| 7,840,685 B2* | 11/2010 | Wyld | 709/227 |
| 8,028,060 B1* | 9/2011 | Wyld et al. | 709/224 |
| 2003/0065816 A1* | 4/2003 | Dharmadhikari et al. | 709/240 |
| 2004/0114610 A1 | 6/2004 | Featherston et al. | |
| 2004/0205158 A1 | 10/2004 | Hsu | |
| 2005/0030939 A1 | 2/2005 | Roy et al. | |
| 2005/0080880 A1* | 4/2005 | von Tetzchner et al. | 709/219 |
| 2005/0154996 A1* | 7/2005 | Othmer | 715/774 |
| 2005/0254430 A1* | 11/2005 | Clark et al. | 370/241 |
| 2005/0281270 A1 | 12/2005 | Kossi et al. | |
| 2006/0128402 A1* | 6/2006 | Lee et al. | 455/464 |
| 2007/0011335 A1 | 1/2007 | Burns et al. | |
| 2007/0197256 A1* | 8/2007 | Lu et al. | 455/552.1 |
| 2007/0232358 A1* | 10/2007 | Sherman | 455/560 |
| 2008/0066016 A1 | 3/2008 | Dowdy et al. | |
| 2008/0080549 A1 | 4/2008 | Rofougaran | |
| 2008/0192681 A1* | 8/2008 | Lee et al. | 370/328 |

FOREIGN PATENT DOCUMENTS

WO   WO 2006/123916   * 11/2006 ............... H04B 1/40

OTHER PUBLICATIONS

"About Network Browsing and Connected Servers in MAC OSX", http://docs.info.apple.com/article,html?artnum=107804, Sep. 25, 2007, 8 pages.
"Apple Announces Mac OS X "Panther"", http://www.apple.com/pr/library/2003/oct/08panther.html, Oct. 8, 2003, Cupertino, CA, 3 pages.
PCT International Search Report and Written Opinion for Int'l Application No. PCT/US2007/026007, mailed Jul. 1, 2008 (12 pages).
(All above are found in parent U.S. Appl. No. 11/620,700).

* cited by examiner

*Primary Examiner* — Alicia Baturay
(74) *Attorney, Agent, or Firm* — Park, Vaughan, Fleming & Dowler LLP (57) ABSTRACT

A method for dynamic network transport selection is described. An indication from a user of a client device is received, to fetch over a data network media of a predefined type. One of a number of network transport physical layers in the client device is automatically assigned, based on a number of stored, ranked media types and network transport physical layer types, for use in fetching the media over the data network. Other embodiments are also described and claimed.

16 Claims, 4 Drawing Sheets

DYNAMIC NETWORK TRANSPORT SELECTION

This application is a divisional of U.S. patent application Ser. No. 11/620,700, filed on Jan. 7, 2007 now U.S. Pat. No. 7,840,685.

An embodiment of the invention is directed to managing data network communications in a client device. Other embodiments are also described.

BACKGROUND

A data network allows people to communicate with each other and obtain information from various sources on the network, using their respective client devices that are "on" the network. For example, a Web browser application program, running in a user's workstation or laptop computer, can connect with a Web server to download a Web page. The connection may span several intermediate nodes or hops of the network, which may include specialized computers such as routers. These devices can discover routes between the end nodes through which they can forward messages that have been broken up into packets of data. Each node may be assigned a unique or global address, such as an Internet Protocol (IP) address. The Internet is a well known global inter-network in which networks of computers are connected to each other via routers.

Computer network protocols have a layered architecture. Typically, the upper most layer includes the functionality provided by an application program, such as a Web browser. This is the layer that, at least in the end nodes, may initiate a connection between two computers over a network. Thus, for example, a user may select a desired Website on his client device. The Web browser (running in that client device) starts a procedure that results in a connection being made with a server that is associated with the selected Website. The Web browser sends the request "down" through a stack of layers referred to as an Internet protocol suite or Transport Control Protocol/Internet protocol (TCP/IP) stack. This stack of protocols is typically implemented in software at its higher layers, often as part of an operating system (OS) program running in the client device. Once the selected Website has been translated into an IP address of a Web server, the server is located over the Internet, and an appropriate connection is made with an upper layer program of a similar protocol suite implemented in the Web server.

To use the connection, the TCP/IP stack in the client device encapsulates a request message from the Web browser, in this example, a request identifying the Web page. The message may be encapsulated more than once, by several vertical layers on its way down in the protocol stack, including a network access layer. It finally arrives at the lowest layer of the client device, namely the physical layer (which is typically deemed to be a part of the network access layer).

The physical layer includes hardware, and may also include software, that is responsible for delivering the encapsulated message to the next device in the network. For example, Ethernet is a family of frame-based computer networking technologies for local area networks (LANs), which defines a number of wiring and signaling standards for its waveguide-based (e.g., wire; optical fiber) physical layer. Ethernet also defines several means of network access at what is referred to as the media access control (MAC) or data link layer, just above the physical layer. In recent years, a wireless LAN technology standardized by IEEE 802.11, also referred to as Wi-Fi, has been used in addition to or instead of Ethernet in many installations. Currently, many laptop computers are shipped with Wi-Fi capability, in addition to an Ethernet port. The Wi-Fi capability links the client device to a nearby base station or wireless router. An Ethernet cable links the client device to a router or an adapter (such as a DSL modem).

After leaving the client device and then making its way through one or more hops in the network, the message from the Web browser arrives in the Web server, and is passed "up" the protocol stack in the Web server to a program that is deemed a peer of the Web browser. The peer program may then respond to the message, by causing the data for the requested Web page to be collected and sent back to the client device through the existing network connection. The data is broken up into multiple messages or packets, and is sent in a manner analogous to how the request message was sent.

Most recently, conventional cellular telephone handsets have been enhanced with the capability of Web browsing and email access for the subscriber, in addition to providing two-way voice communications. For instance, a digital mobile phone technology (including a special physical layer) that allows for improved data rate and reliability to support a packet switched Internet connection, has been deployed, referred to as Enhanced Data rates for GSM Evolution (EDGE). Such cellular phone handsets are advertised as being able to run high speed data applications such as video services. There is also the upcoming third generation (3G) mobile phone technology known as Universal Mobile Telecommunications System (UMTS) that allows the client device to communicate with a base station using a W-CDMA air interface (in the physical layer).

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
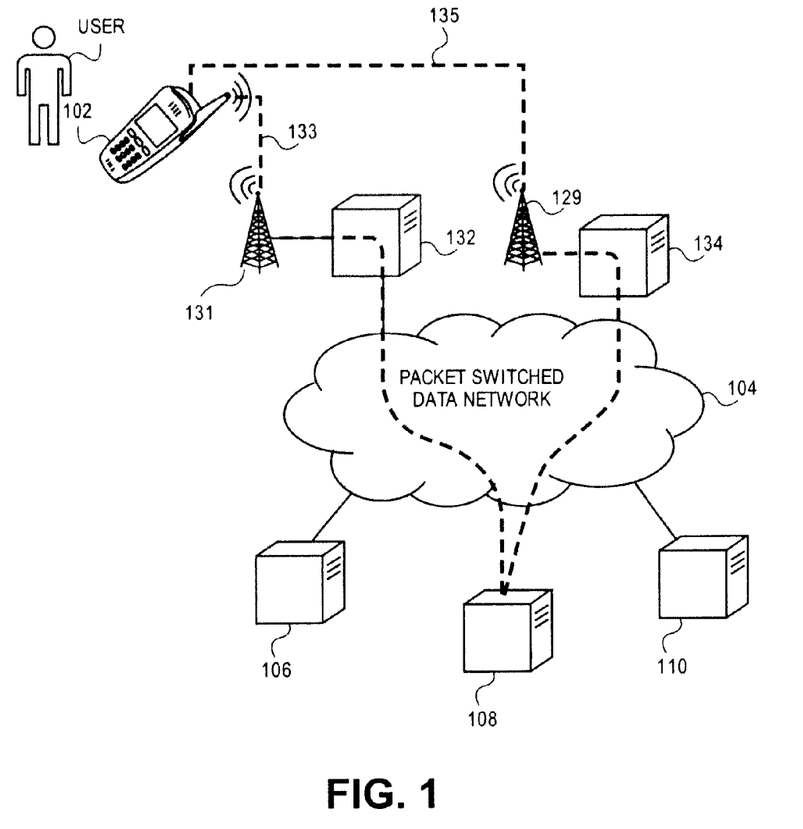
FIG. 1 is a diagram of a client device within a data network environment.

An embodiment of the invention is directed to dynamic network transport selection in a client device. FIG. 1 is a diagram of a client device 102 that is operating in a network environment, according to an embodiment of the invention. The client device 102 may be desktop computer, a notebook or laptop computer, a video game machine, a personal digital assistant (PDA), a cellular telephone handset with email capability, a home entertainment system, or other consumer electronics product. The client device is on a packet switched data network 104. The network 104 may be an Internet Protocol (IP) network, which may be a wide area network or a global, pubic inter-network, such as the Internet. Also on the network 104 are an email server 106, a voicemail server 108, and a Web server 110. These are just examples of the different end nodes with which the client device 102 can communicate.

FIG. 1 also shows in dotted lines, two communication paths 33, 135, between the client device 102 and a server, in this example, the voicemail server 108. Each path 133, 135 has a wireless segment, between the client device 102, which in this case may be a portable or mobile computer system, and a respective base station 131, 129. Each base station 131, 129 communicates with a respective network access gateway 132, 134. The network protocol suites used to communicate over each path 133, 135 are different. To reach the voicemail server 108, the client device can dynamically select the network transport as described below, to effectively connect a voicemail application running in the client device 102 via either path 133 or path 135. For instance, path 133 may be part of a Wi-Fi link, whereas path 135 may be an EDGE link. There may also be an additional wireline path, such as an Ethernet segment (not shown), that couples the client device 102 to another gateway on the network 104. Additional aspects of the different embodiments of the invention including how the selection between the different protocols is made will be described below.

Figure 2:
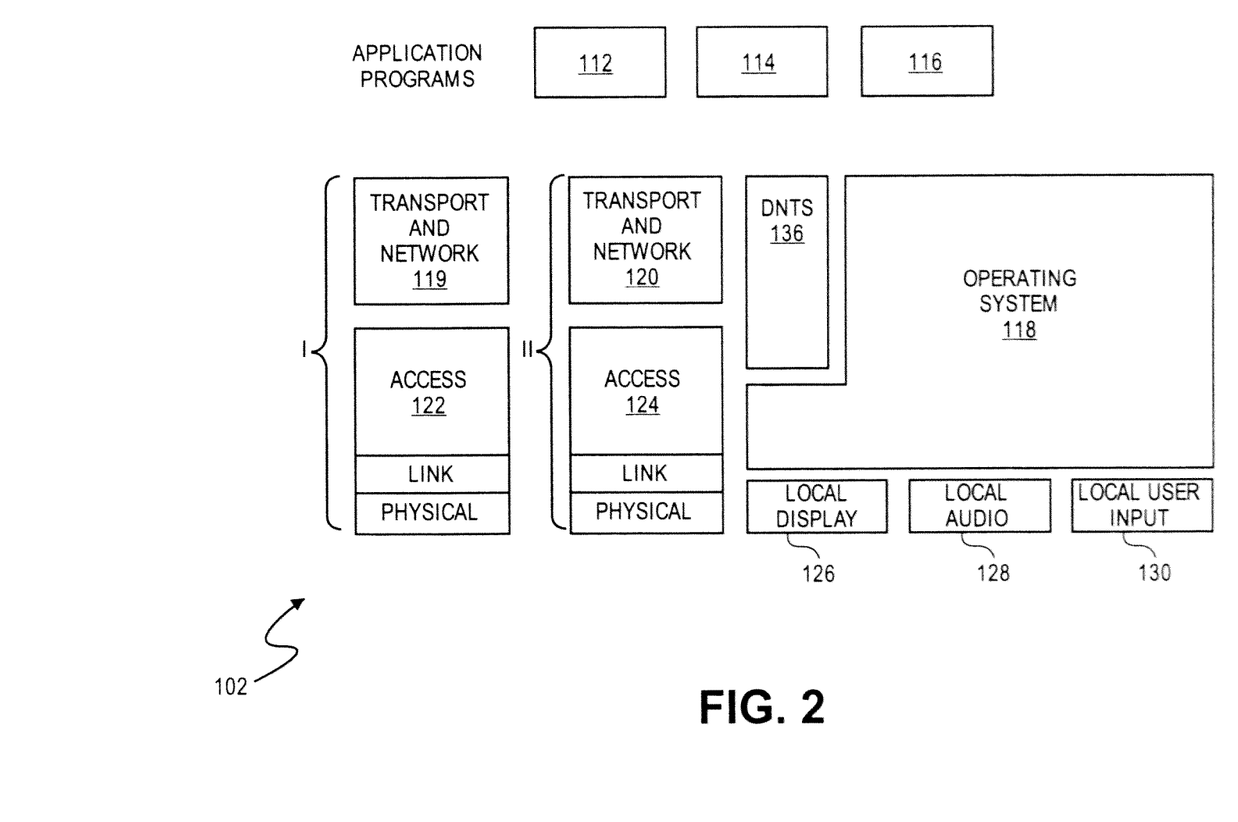
FIG. 2 is a block diagram of the client, device, in accordance with an embodiment of the invention.

FIG. 2 shows a block diagram of the client device 102, in accordance with an embodiment of the invention. One or more application programs 112-116 are stored in the client device 102. An application program may be, for example, a Web browser, a dedicated email client, or a voice over IP telephony application. Application programs may consume different types of media, e.g. video stream, audio stream, email, and text chat.

The application programs 112-116, as well as other software components described below, are comprised of instructions stored in some form of machine-readable medium within the client device 102. The machine-readable medium may be part of a solid state memory, a rotating magnetic disk drive, or other suitable storage device. The client device 102 may also include one or more processors (not shown) that are to execute the stored instructions to perform the functionality described below.

The application programs 112-116 run on top of an operating system 118. An example of the operating system 118 is the Mac OS by Apple Computer, Inc., of Cupertino, Calif., for a desktop or laptop client device. Alternatively, an embedded or real-time operating system may be used, in situations where the client device 102 is an embedded computer system such as a personal digital assistant (PDA) handset or a cellular telephone handset.

The client device 102 may also include a local display interface 126 that allows the operating system 118 (and the application programs 112-116) to display text and graphics to the user, a local audio interface 128 which may include, for example, speakers, and a local user input interface 130 which may include a keyboard, an alphanumeric keypad, a mouse or other cursor control and pointing device, and/or a combination touch sensitive display surface.

The client device also implements at least one set of transport and network layers 119 of a network communications protocol. These may be part of a TCP/IP stack, also referred to as an Internet protocol suite. There may also be a second set of transport and network layers 120 available in the client device, that implement a different protocol suite.

Each set of transport and network layers 119, 120 is on top of a network access layer 122, 124. The network access layer may be viewed as split into a data link layer on top of a physical layer. Examples of network access layer protocols (and their associated physical layers) are Ethernet, Wi-Fi, Bluetooth, General Packet Radio Services (GPRS) over a GSM physical layer, and UMTS over W-CDMA. The term "network transport physical layer" (NTPL) as used here refers to hardware and software which implements the lowest portions of a network access layer protocol.

The client device has at least two different network access layers 122, 124 (or NTPLs). These may have different throughput specifications (e.g., given in terms of download or upload bits per second), and/or different usage costs for the user of the client device 102. Each network access layer 122, 124 or NTPL) allows the client device 102 to join the data network 104, via respective network access gateways 132, 134. The gateway 132 may be a Wi-Fi gateway (where physical layer I of access layer 122 is implemented using Wi-Fi technology). Gateway 134 may be a GSM EDGE gateway (where physical layer II of access layer 124 is implemented by GSM EDGE technology). The gateway 132 may include a wireless router that can connect to a backend server on the data network 104, which allows multiple wireless client devices to share a broadband cable link to the Internet. For certain wireless technologies, each gateway 132, 134 may include a wireless base station that is the first link in the communication chain between the client device 102 and another node on the network 104.

As depicted in FIG. 2, the client device 102 may have several access layers 122, 124 (including their associated physical layers), each of which can be shared by multiple applications running in the client device that wish to access the network 104. The combination of transport and network layers 119 may be working with access layers 122, to support one or more network connections, and another combination of transport and network layers 120 may be working with access layers 124 to support another set of connections. A single network connection can be made through either stack I or stack II, but not both.

Note that in some cases, the transport and network layers 119 may be the same as transport and network layers 120. In other instances, the access layers 122 and 124 may have the same link layers, but different physical layers. In another embodiment, the network layer portion of transport and network layer 119 may instead be considered to be part of the access layers 122. In other words, the client device 102 may have a topology where the same transport layer interfaces with two different network layers, the latter being part of two different access layers, respectively.

In laptop computers offered by Apple Computer, Inc. of Cupertino, Calif., some of the more recent versions of the Mac OS may automatically switch a network connection from wired Ethernet to Wi-Fi, if the Ethernet cable is unplugged from the computer (and if the network connection can be established over Wi-Fi). Thus, a Web browser connection that was originally using wired Ethernet will be automatically changed by the Mac OS to use Wi-Fi, in response to detecting that the Ethernet cable has been unplugged.

In accordance with an embodiment of the invention, the client device 102 has a dynamic network transport selector (DNTS) 136 operating above the physical layers. The DNTS 136 is to automatically assign, based on a number of ranked media types and ranked NTPL types, all, or some, or none of which may be stored in the client device 102, one of the different NTPLs of the device 102, for use in fetching given media over the data network 104. This helps improve user experience, by making more efficient use of the network resources available in the client device 102. For example, consider a client device that has Wi-Fi and EDGE as its NTPLs (there may also be others, e.g. Ethernet). In certain "hotspots" and under certain load conditions, a Wi-Fi connection may still be faster than an EDGE connection in the client device, but not by a sufficiently wide margin. Accordingly, the DNTS 136 could be made aware of this fact, and would in turn assign Wi-Fi to only service video applications or video downloads, if Ethernet is unavailable, and EDGE to service other media types (being requested at the same time as the video download) such as email, digital voicemail, and Internet telephony. This assignment may be based on a stored, ranking table, such as the following:

| Media types | NTPL types |
|---|---|
| Video | |
| | Ethernet |
| Audio | |
| | Wi-Fi/g |
| Browser pages | |
| HTML-based Email | |
| | UMTS |
| | Wi-Fi/b |
| Text-based Email | |
| Text chat | |
| | EDGE |

The table above shows that Video is given the highest priority among the recognized media, and Ethernet is the highest priority NTPL. Assignments could be made based on determining the highest ranked combination of one of the media types and one of the NTPL types. For example, the assignment Video-Ethernet would take priority over Audio-Ethernet, which would take priority over Browser pages-Wi-Fi/g. The above ranking table or list is just an example and is used here only to illustrate the concept.

The ranking list may be set initially for the client device at the factory, and then may be updated during use. For example, the DNTS 136 could keep a history of measured throughput for each NTPL type, and routinely compare the measured throughput levels to decide whether to raise or lower the ranking of a particular NTPL. Cost can also be a factor in the rankings, e.g. an NTPL might be a little slower but because it comes with a significantly cheaper service subscription, it might be ranked higher than another. The rank of a media type can be changed based on whether an associated application program for that media type has come to foreground.

To refine the process of pairing a media type with an NTPL type, ranking values may be added to the table above. For example, Video may be given a ranking value of 90, Audio would be given 70, while Text-based Email could have a value of 50. For the NTPLs, Ethernet could be given a value of 80, Wi-Fi/g 80, Wi-Fi/b 30, and EDGE 10. Assume that the client device is downloading a video stream (e.g., user is watching a news clip off a Website) when at the same time there is an incoming Internet telephony call. Using a simple formula approach, the Video and Ethernet pairing from the table would give a sum of 170, while the Audio and Ethernet pairing would sum to 150 (lower priority than the Video-Ethernet pairing). Therefore, Ethernet should be used to service the video stream.

Note that in this case, the Audio and Wi-Fi/g pairing would also sum to 150. By using rules (which in some embodiments may be predefined), the DNTS 136 could make a decision in such a circumstance, regarding which NTPL, Ethernet or Wi-Fi/g, to assign to fetch the Audio (here, service the Internet phone call). For instance, a rule could be defined that, all else being equal, the pairing which yields the lowest monetary cost to the user should be selected. A cost formula could be defined for each NTPL type that would give a monetary value for a certain amount of throughput, at a certain time of the day, and/or at a certain location. A bandwidth rule could define the upper limits of the throughput for each NTPL, or it could list the types of media that should not share the same NTPL. Such a rule might call for the DNTS 136 to determine the throughput or Quality of Service of each NTPL, by making measurements of actual network activity in the client device and providing an average value. By applying a combination of such rules to compute a resulting "figure of merit" for each possible pairing, the DNTS would be able to deterministically break any ties, and in the above example select between the Wi-Fi/g or Ethernet assignment. This may allow the user to more effectively experience both the Internet telephony connection and the simultaneous video stream.

Rules

The automatic assigning of an NTPL for a media fetch may be further based upon one or more of the following additional rules, and/or variations of them. This also means that some of the rules may be applied to change the current ranking of the media types and/or or the NTPL types. An NTPL assignment is preferably made based upon the current rankings.

A rule can be defined that takes into consideration a determined pattern of a user's usage of the client device. The pattern may be measured by the DNTS 136 monitoring network activity associated with a particular application program or media type. For instance, if the user checks her email at certain times of the day, and the email messages are particularly rich (e.g., HTML as opposed to just text), then the rule might call for temporarily moving the Email media type higher in rank. If the user routinely checks his stock quotes or the weather at a certain Web page, and since the network throughput requirement for such media types is relatively low, then the browser media type could be temporarily dropped in rank.

Another rule could consider the user's preferences as overriding other assignment determinations, e.g. the user might want to have her digital voicemail be checked only with a certain NTPL. This may be enabled by providing the client device with a graphical user interface (GUI) through which the user can manually set her preferred NTPL to be used for a given application (or a given media type) that accesses the network.

Yet another rule would apply cost considerations, based on input from the user. For example, the user's subscription contract with a particular service provider might have a range of different costs depending upon the level of throughput used by a certain NTPL.

A further rule would consider an estimate of the performance level of a current network connection, based upon a history of the user having visited different network locations. For example, assume that a certain Wi-Fi hotspot into which the client device has just entered has shown very high throughput capabilities in the past (as measured by the DNTS 136). Accordingly, this rule would temporarily bump the Wi-Fi NTPL type higher in rank, so long as the client device remains in the hotspot, and would drop the rank when the client device has left the hotspot.

As suggested above, whether a media type is associated with an application in foreground or background can also be used to change the rankings. For instance, if a video player application and a Web browser have both gone into background, and a word processor is in foreground, then the Video media type can be temporarily dropped in rank (because it is unlikely that a video connection will be used soon at this time). However once the Web browser returns to foreground, this could trigger Video to be bumped up. If the rankings also have values, then a number can be defined for how much the rank of a media type is raised or lowered. For instance, if an email application comes to foreground then the email type may be increased by 5 (priority increased by 5), but if text chat comes into foreground, no change is made to its rank value (zero, or priority unchanged). That may be explained by the observation that throughput needed by a text chat connection is very small relative to most other media types.

In another scenario, the ranking of the NTPL types is updated based on the DNTS 136 having determined that the user has started to repeatedly request work from an application program that remains in foreground. For example, the DNTS could detect that the user has started to click through her email messages, so that the media type ranking for Email should be raised.

Sometimes, an existing media-NTPL assignment that is being used for fetching certain media over the network, should be changed, to free some network bandwidth for another media type. The change in that case may occur in response to an application program coming to foreground that has a higher ranked media type than that of the existing assignment. Alternatively, the change may occur in response to the rank of the media type of the existing assignment being lowered.

Figure 3:
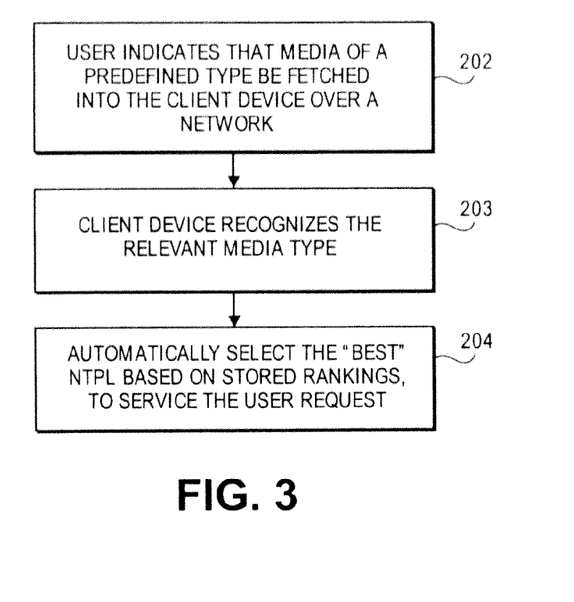
FIG. 3 is a flow diagram of a process for dynamic network transport selection.

A method for dynamic network transport selection is now described with reference to some of the elements identified above in connection with FIG. 2. A flow diagram of such a process is depicted in FIG. 3. Somewhere in the client device 102, an indication is received to fetch, over the data network 104, media of a predefined type (block 202). In one embodiment, this indication may be a received from a user of the client device. For example, the user selects a Website and, in response, the browser requests the OS to open a connection to a Web server.

After having recognized the relevant media type (block 203), one of the NTPLs available in the client device is selected and assigned automatically, to open the requested connection over the network (block 204). The selection and assignment is made based on several ranked media types (one of which is the indicated or recognized media type), and based on several ranked NTPL types (which correspond to the available NTPLs in the client device). The ranking of the media types may be maintained either by an application, or by the OS. In addition, the application can be designed to inherently recognize the type of media it is requesting over the network. The application can, in such cases, make the decision on the NTPL assignment for its request (and will communicate the assignment to the OS). The connection is then opened, and data transfer between the remote server and the client device can proceed through the assigned NTPL. One or more of the rules described above can be applied to inform the decision on which NTPL type to select.

Application Programming Interface

Figure 4:
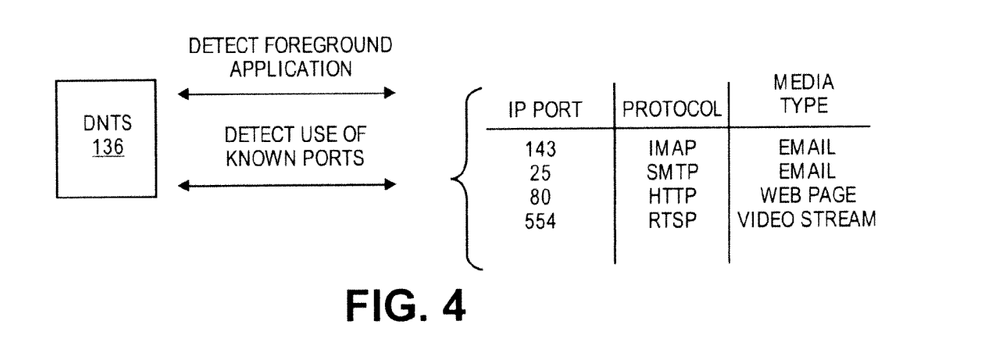
FIG. 4 shows different sources of information for a dynamic network transport selector, including example IP port values that appear in certain connection requests.

As suggested above, the DNTS 136 needs to recognize or otherwise obtain knowledge of the media type used in a connection request, to inform its decision on the NTPL assignment. One way to do so is to expose the IP port value that might appear in the connection request. FIG. 4 shows different sources of information for a dynamic network transport selector, including example IP port values that appear in certain connection requests.

In accordance with an embodiment of the invention, the DNTS 136 is implemented as software that may interact with an operating system 118 in which application programming interfaces (APIs) are provided that are similar to those in the Unix BSD operating system. The software mechanism below may be part of an inter-process communication that allows an application program in the client device 102 to communicate with a peer program in a remote server. First, a socket is created by the application program making an operating system call. This socket is then associated with the data network address (e.g., IP address) of the server with which the application program wishes to communicate. There is an assumption here that the data network address has been previously obtained by the application program, for example, using a domain name service (DNS). After the server has been contacted, the server can then agree to listen on its corresponding socket. The application program may, as a client, then request services from the server, by initiating a connection to the server's socket, using, for example, a connect call. After the server has accepted and a connection has been established, data may begin to flow, using, for example, read and write calls.

It is possible to set and get a number of options on sockets, via existing system calls, such as setsockopt and getsockopt. In accordance with an embodiment of the invention, for setting the interface used for a connection, the normal BSD API, setsockopt, is used. A new option is created, for example, named IP_FORCE_OUT_IFP, which allows the DNTS 136 to specify the NTPL type that is to be assigned to service the network traffic in the requested connection. In one embodiment, this may be achieved by modifying the CFNetwork, which is a programming framework of Apple Computer, Inc. that provides a library of abstractions for network protocols. The CFNetwork abstraction makes it easier to perform a variety of network tasks, including working with BSD sockets. More specifically, CFNetwork may be modified to expose a new property, referred to here as KCFStreamPropertyInterfaceName, which allows the DNTS to specify the NTPL type to use. To set this property, a client can make a call to CFReadStreamSetProperty or CRWriteStreamSetProperty with that property name and the value to be used. This client, deemed a part of the DNTS 136, may be implemented as part of application program code or it may be part of OS code. An API with the above characteristics for the DNTS 136 may be developed by the same entity that develops the operating system 118.

In one embodiment, the API provides a call that returns ranking information, which is information that may then be used to influence the weighting or priority of a particular media type or NTPL type. For example, the call may return one or more of the categories of information described above as needed by the rules for updating the rankings.

Figure 5:
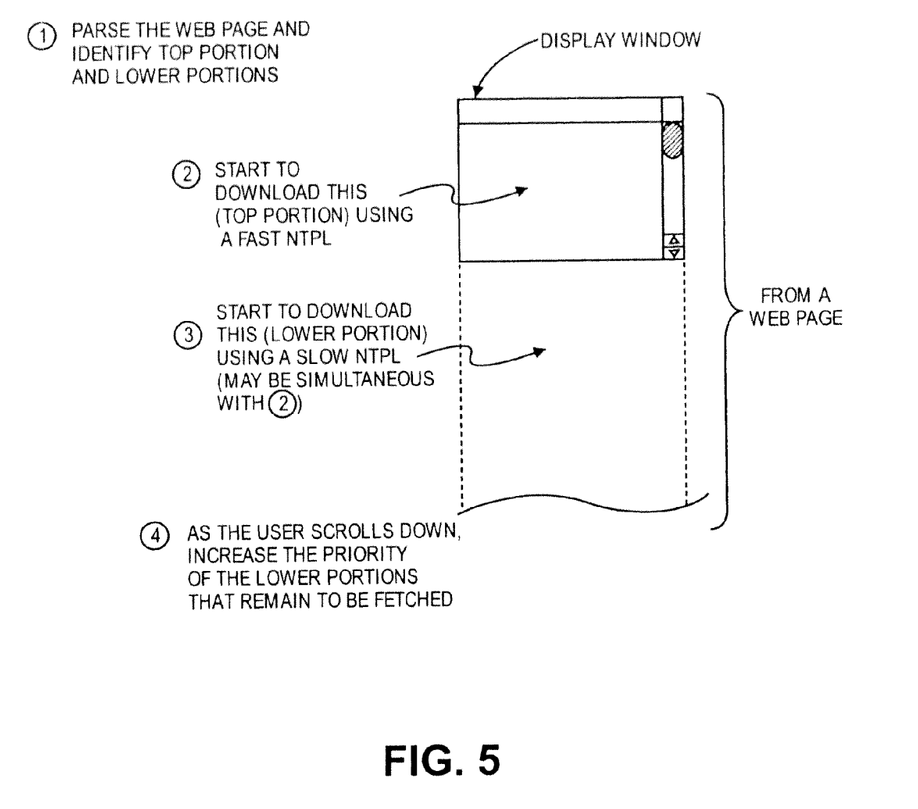
FIG. 5 depicts a process for efficiently displaying a long Web page, by dynamically changing the network transport physical layer used.

Turning now to FIG. 5, a process for efficiently displaying a Web page, by dynamically changing the network transport physical layer that is used, is shown, in accordance with another embodiment of the invention. This is an example of the case where some of the functionality of the DNTS 136 described above is actually implemented by code that is part of an application program (e.g., a Web browser). The process begins with parsing a "long" Web page, and identifying one or more top portions and one or more lower portions of the page as displayed. The reference to "long" is intended to encompass Web pages that, when displayed, have one or more lower portions that are outside of the foreground display window.

The application consults a ranking of the different NTPLs available in the client device, and a ranking of different media types. A decision is made by the application as to which NTPL to use for high priority tasks, and which NTPL to use for low priority tasks. This decision may then be signaled to the operating system. A request is sent to the operating system, to start the download of the top most portion of the Web page, using a high priority (translating in most cases to fast or high throughput) NTPL in the client device. At the same time, a request may be sent to start downloading one or more lower portions of the Web page, using a lower priority (e.g., "slow")

NTPL. The lower portion is outside of the display window and would appear in the display window once the user begins to scroll the display window down.

As the user begins to scroll down, the rank or priority of the lower portions of the Web page that remain to be fetched may be changed, e.g. increased, so that the remaining portions of the page are fetched more quickly (to meet the user's viewing demands). To analogize with the table shown above that lists media types and available NTPL types, in this embodiment of the invention, the media types are references to portions of a parsed Web page, beginning with the highest priority (or highest rank) as the portion that is in the foreground display window. The list of NTPL types may include the same information as before, namely references to the different NTPLs available in the client device for downloading Web pages, with the combination of the fastest and cheapest NTPL having the highest priority (or highest rank).

In one embodiment, there may be several different media types that are fetched in a client device, in an interleaved manner. The fetches may be spread over different NTPL types, to make more efficient use of the network resources in the client device. For example, consider the situation where a Web browser application running in the client device is assigned to a faster NTPL, while an email program is assigned to a slower NTPL. This may be referred to as the first assignment. If the user then switches from the Web browser to the email program (e.g. the email program becomes foreground, and the Web browser becomes background), the DNTS 136 may respond by swapping their respective NTPL assignments, resulting in a second assignment. This might be achieved by, for example, changing the media type ranking described above, by simply swapping the priority levels of the Web browser and email media types. The OS could then respond to the second assignment, by enabling email to be read using a connection through the faster NTPL rather than the slower one. Thereafter, when the user switches back to the Web browser as foreground, the DNTS 136 may again respond by reverting back to the first assignment. This type of interleaving may also be applied to the downloading of a Web page as described above in connection with FIG. 5. For example, in that case, the first assignment may use a faster NTPL to load an upper portion of the Web page and a slower NTPL to load a lower portion, while the user is viewing the top portion. In response to the user next having scrolled down to the lower portion, the second assignment occurs, which swaps out the slower NTPL for the faster NTPL, to load the portion which the user has just scrolled down to.

The forgoing description has used specific embodiments of the invention. It will be apparent, however, that variations and modifications may be made to the above, in order to obtain some or all of the advantages mentioned. It is intended that the appended claims cover all such variations and modifications as they would fall within the true spirit and scope of the invention.

What is claimed is:

1. A method of dynamic network transport selection, comprising:
   ranking a plurality of media types and a plurality of network transport physical layer (NTPL) types in the client device and storing the ranked media types and NTPL types in a ranking table, wherein each of the plurality of NTPLs includes a physical layer and a data link layer;
   receiving an indication from a user of a client device to fetch, over a data network, media of a predefined type; and
   automatically assigning, based on the ranking of the media types and NTPL types in the ranking table and on a determined pattern of the user's usage of the client device, one of the NTPLs for use in fetching the media over the data network.

2. The method of claim 1 wherein the automatically assigning is further based on a determined throughput of each of the plurality of NTPLs in the client device.

3. The method of claim 1 wherein the automatically assigning is further based on determining the highest ranked combination of one of the media types and one of the NTPL types.

4. The method of claim 1 wherein ranking a plurality of media types and a plurality of NTPL types comprises:
   updating the stored, ranked media types in the ranking table based on determining whether an application program that is accessing one of the media types in the client device is running in background or foreground.

5. The method of claim 4 wherein ranking a plurality of media types and a plurality of NTPL types comprises:
   updating the stored, ranked media types in the ranking table based on determining that the user has started to repeatedly request work from an application program that remains in the foreground.

6. The method of claim 1 wherein ranking a plurality of media types and a plurality of NTPL types comprises:
   updating the stored, ranked NTPL types in the ranking table based on determining that the client device has traveled outside a WLAN hotspot.

7. The method of claim 1 wherein ranking a plurality of media types and a plurality of NTPL types comprises:
   updating the stored, ranked media types in the ranking table based on determining that the user historically runs a particular application program in the client device at a certain time interval of the day.

8. The method of claim 1 wherein the media types refer to video, audio, email, and text chat.

9. The method of claim 1 wherein the NTPL types refer to a wireless local area network (WLAN) technology and a cellular telephone technology.

10. The method of claim 1 further comprising:
    changing an existing NTPL assignment that is being used for fetching the media over the data network, in response to an application coming to foreground that has a higher ranked media type.

11. An article of manufacture comprising:
    a non-transitory machine-readable medium that stores instructions which, when executed by a processor in a client device, cause the processor to perform operations for:
    ranking a plurality of media types and a plurality of NTPLs on the client device and storing the ranked media types and NTPLs in a ranking table; and
    selecting, based on the ranking of the media types and NTPLs in the ranking table and on a determined pattern of the user's usage of the client device, one of the plurality of NTPLs to service a network access request generated in the client device.

12. The article of manufacture of claim 11 wherein the request refers to any one of a plurality of types of media to be downloaded, the plurality of types of media comprise video stream, audio stream, email message, voicemail message, and text chat.

13. The article of manufacture of claim 11 further comprising modifying or overriding the ranking of the media types and NTPL in the ranking table based on a received command.

14. The article of manufacture of claim 11 wherein the selecting is further based on applying a plurality of rules that consider the following:
   whether an application is in foreground or background;
   type of interaction between the user and an application that is in foreground; and
   monetary cost of network access using one of the NTPLs.

15. The article of manufacture of claim 11 wherein the machine-readable medium stores further instructions that make up an operating system program, and wherein the instructions for dynamic network transport selection are developed by the same entity who developed the operating system program.

16. A client device comprising:
   a first NTPL that accesses media from a server through a data network, the first NTPL including a physical layer and a data link layer;
   a second NTPL that accesses the media from the data server through the data network, the second NTPL including a physical layer and a data link layer, wherein the client device can access the media via either the first NTPL or the second NTPL, one at a time; and
   one or more processors, the one or more processors performing operations for:
      ranking the first NTPL and the second NTPL and plurality of media types and storing the ranked NTPLs and media types in a ranking table, and
      selecting the first or the second NTPL to access the media based on the rankings in the ranking table and an historical pattern of usage of the client device by the user.

* * * * *